(12) United States Patent
Ahn et al.

(10) Patent No.: US 9,516,578 B2
(45) Date of Patent: Dec. 6, 2016

(54) METHOD AND DEVICE FOR DETECTING DISCOVERY SIGNAL

(71) Applicant: LG ELECTRONICS INC., Seoul (KR)

(72) Inventors: Joonkui Ahn, Seoul (KR); Yunjung Yi, Seoul (KR); Daesung Hwang, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/653,513

(22) PCT Filed: Jan. 13, 2014

(86) PCT No.: PCT/KR2014/000358
§ 371 (c)(1),
(2) Date: Jun. 18, 2015

(87) PCT Pub. No.: WO2014/109615
PCT Pub. Date: Jul. 17, 2014

(65) Prior Publication Data
US 2015/0351003 A1    Dec. 3, 2015

Related U.S. Application Data

(60) Provisional application No. 61/752,392, filed on Jan. 14, 2013.

(51) Int. Cl.
*H04W 4/00* (2009.01)
*H04W 48/10* (2009.01)
*H04B 7/26* (2006.01)
*H04W 56/00* (2009.01)

(52) U.S. Cl.
CPC ........... *H04W 48/10* (2013.01); *H04B 7/2656* (2013.01); *H04W 56/0015* (2013.01)

(58) Field of Classification Search
CPC ...................................................... H04W 48/16
USPC ......................................................... 455/434
See application file for complete search history.

(56) References Cited

U.S. PATENT DOCUMENTS

2010/0239034 A1* 9/2010 Lee .................... H04L 5/0053
375/260
2011/0194407 A1* 8/2011 Ji ......................... H04B 7/2606
370/226

(Continued)

FOREIGN PATENT DOCUMENTS

WO    2007114638 A2    10/2007
WO    2009153165 A1    12/2009

(Continued)

OTHER PUBLICATIONS

"Enhanced Cell Identification for Additional Carrier Type" 3GPP TSG RAN WG1 Meeting #68 R1-120398 Dresden, Germany, Feb. 6-10, 2012.

*Primary Examiner* — Thomas Lett
(74) *Attorney, Agent, or Firm* — Dentons US LLP

(57) ABSTRACT

A method and a device for detecting a discovery signal in a wireless communication system are provided. A wireless device receives a discovery setting for detecting a discovery signal of a target cell from a serving cell, and detects the discovery signal transmitted by the target cell according to the discovery setting. The discovery setting includes information on a discovery subframe to which the discovery signal is transmitted among a plurality of subframes.

7 Claims, 11 Drawing Sheets

(56) References Cited

U.S. PATENT DOCUMENTS

2012/0213109 A1 8/2012 Xu et al.
2014/0171073 A1* 6/2014 Kim .................. H04W 48/16
455/434

FOREIGN PATENT DOCUMENTS

| WO | 2011013989 A2 | 2/2011 |
| WO | 2012116031 A1 | 8/2012 |
| WO | 2012167471 A1 | 12/2012 |

* cited by examiner

METHOD AND DEVICE FOR DETECTING DISCOVERY SIGNAL

This application is a 35 USC §371 National Stage entry of International Application No. PCT/KR2014/000358 filed on Jan. 13, 2014 and claims priority to U.S. Provisional Application No. 61/752,392, filed Jan. 14, 2013, all of which are incorporated by reference in their entirety herein.

BACKGROUND OF THE INVENTION

Field of the Invention

The present invention relates to wireless communications, and more particularly, to a method and apparatus for detecting a discovery signal in a wireless communication system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In order to provide a higher data rate to a device, a communication system which deploys a plurality of cells in a specific region is introduced. The device is required to detect many cells existing in a neighboring area within a short time period and to perform a measurement on signal quality of a corresponding cell.

A synchronization signal is a representative signal used for cell detection. Since the conventional synchronization signal is designed by considering cells deployed in a relatively wide range, it may be not appropriate to detect a great number of cells in a congested region.

SUMMARY OF THE INVENTION

The present invention provides a method and apparatus for detecting a discovery signal.

In an aspect, a method for detecting a discovery signal in a wireless communication system is provided. The method includes receiving, by a wireless device, a discovery configuration for detecting the discovery signal of a target cell from a serving cell, and detecting, by the wireless device, the discovery signal transmitted by the target cell according to the discovery configuration. The discovery configuration comprises information regarding a discovery subframe in which the discovery signal is transmitted among a plurality of subframes.

The method may further include obtaining a cell identity (ID) of the target cell on the basis of the discovery signal.

The discovery subframe may include a plurality of orthogonal frequency division multiplexing (OFDM) symbols, and the discovery signal may be detected in one or more OFDM symbols among the plurality of OFDM symbols.

In another aspect, an apparatus for detecting a discovery signal in a wireless communication system is provided. The apparatus includes a radio frequency (RF) unit configured to transmit and receive a radio signal and a processor operatively coupled to the RF unit. The processor is configured to receive a discovery configuration for detecting the discovery signal of a target cell from a serving cell, and detect the discovery signal transmitted by the target cell according to the discovery configuration. The discovery configuration comprises information regarding a discovery subframe in which the discovery signal is transmitted among a plurality of subframes.

In a wireless communication system in which a plurality of cells are deployed in a congested region, a device can discover the plurality of cells.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) or 3GPP LTE-advanced (LTE-A). This is for exemplary purposes only, and the present invention is also applicable to various wireless communication systems. In the following description, LTE and/or LTE-A are collectively referred to as LTE.

Figure 1:
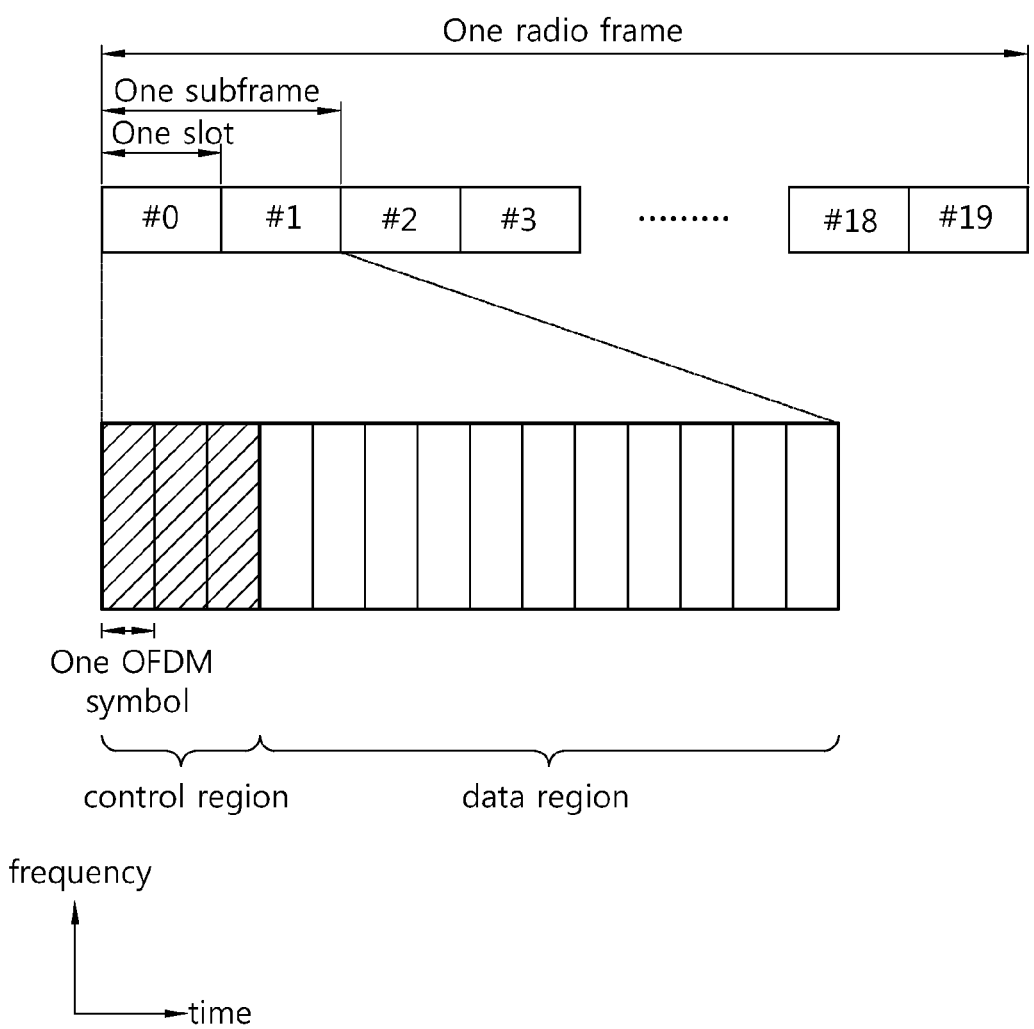
FIG. 1 shows a structure of a downlink (DL) radio frame in $3^{rd}$ generation partnership project (3GPP) long term evolution (LTE).

FIG. 1 shows a structure of a downlink radio frame in 3GPP LTE. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A downlink (DL) subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel include a physical downlink control channel (PDCCH), a physical control format indicator channel (PCFICH) and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

Figure 2:
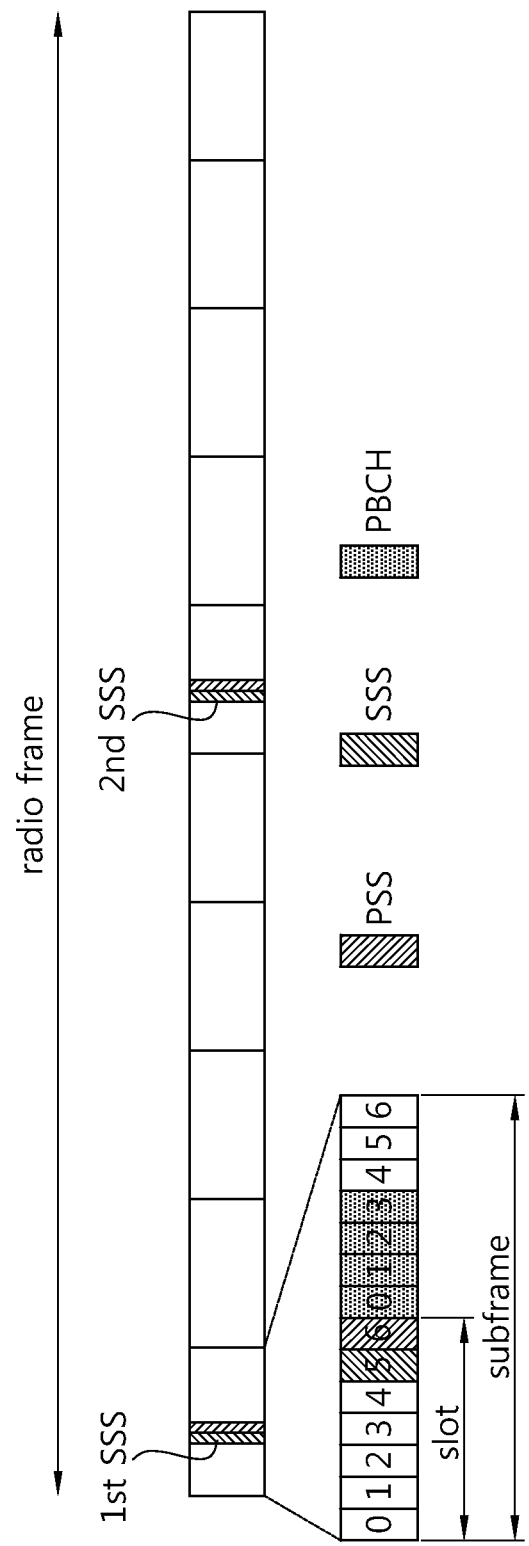
FIG. 2 shows transmission of a synchronization signal in 3GPP LTE.

FIG. 2 shows transmission of a synchronization signal in 3GPP LTE.

The synchronization signal includes a primary synchronization signal (PSS) and a secondary synchronization signal (SSS), and is used for cell discovery.

The PSS is transmitted in a last OFDM symbol of a $1^{st}$ slot (i.e., a $1^{st}$ slot of a $1^{st}$ subframe (or a subframe with an index 0)) and an $11^{th}$ slot (i.e., a $1^{st}$ slot of a $6^{th}$ subframe (or a subframe with an index 5)). The PSS is used to acquire OFDM symbol synchronization or slot synchronization, and is related to a physical cell identity (PCI). Among 3 candidate PSSs, one PSS selected according to the PCI is transmitted.

A secondary synchronization signal (SSS) includes a $1^{st}$ SSS and a $2^{nd}$ SSS. The 1st SSS and the $2^{nd}$ SSS are transmitted in an OFDM symbol adjacent to an OFDM symbol in which the PSS is transmitted. The SSS is used to attain frame synchronization. The SSS is used to attain a cell ID together with the PSS. The $1^{st}$ SSS and the $2^{nd}$ SSS use different secondary synchronization codes (SSCs). If the $1^{st}$ SSS and the $2^{nd}$ SSS each include 31 subcarriers, sequences of two SSCs with a length of 31 are respectively used for the $1^{st}$ SSS and the $2^{nd}$ SSS.

504 PCIs can be identified in total by combining 3 PSSs and 168 SSSs. The PSS, the SSS, and the PBCH are transmitted in 6 RBs within a system bandwidth, and thus a wireless device can be detected irrespective of the system bandwidth.

The PSS may be defined as a Zadoff-Chu sequence with a length of Ns as follows.

$$z(n) = e^{-j\frac{\pi qm(m+1)}{Ns}} \quad \text{[Equation 1]}$$

Herein, q is a root index, and m=0, 1, . . . , Ns−1, where Ns=63. To define 3 PSSs, q has a value of 25, 29, or 34.

A sequence for the SSS is generated by combining two m-sequences S1 and S2 having a length of 31. If a $1^{st}$ SSS is a combination of (S1, S2), a $2^{nd}$ SSS is swapped to (S2, S1). Further, each of S1 and S2 is scrambled with different scrambling sequences.

Figure 3:
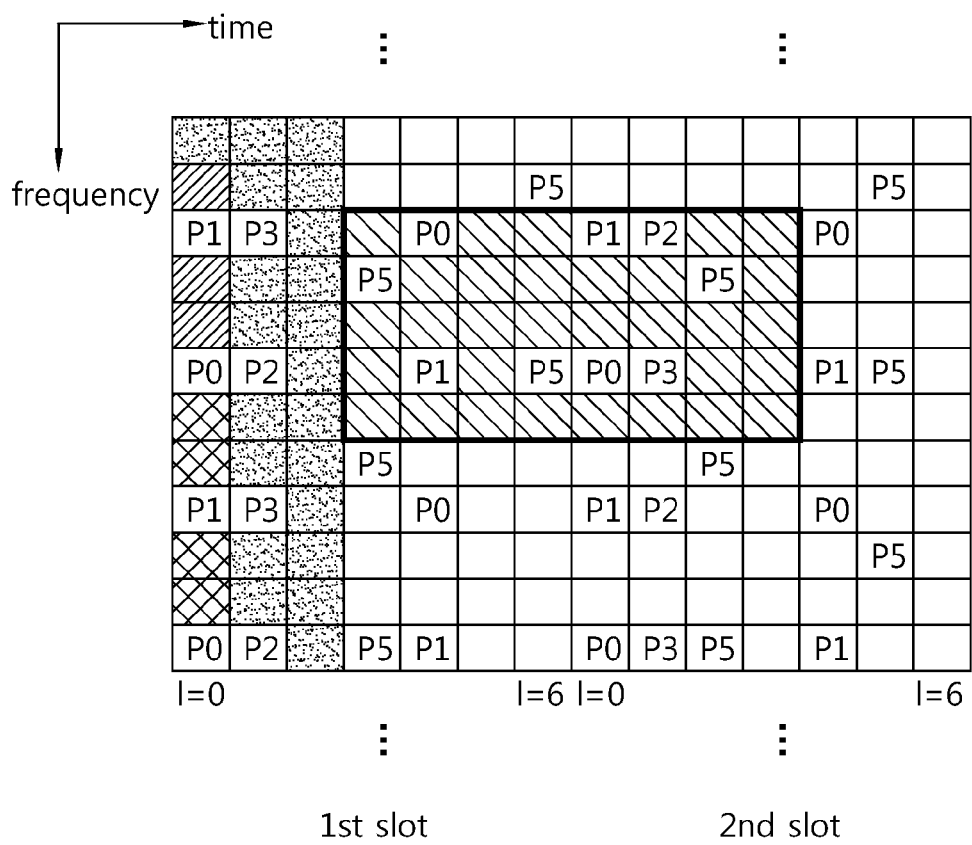
FIG. 3 shows an example of displaying a reference signal and a control channel in a DL subframe of 3GPP LTE.

FIG. 3 shows an example of displaying a reference signal and a control channel in a DL subframe of 3GPP LTE.

A control region includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region in which the UE monitors the PDCCH.

Various reference signals are transmitted in the subframe.

A cell-specific reference signal (CRS) may be received by all wireless devices in a cell, and is transmitted across a full downlink frequency band. In FIG. 3, 'P0' indicates a resource element (RE) used to transmit a CRS for a $1^{st}$ antenna port, 'P1' indicates an RE used to transmit a CRS for a $2^{nd}$ antenna port, 'P2' indicates an RE used to transmit a CRS for a $3^{rd}$ antenna port, and 'P3' indicates an RE used to transmit a CRS for a $4^{th}$ antenna port.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m + 1)) \quad \text{[Equation 2]}$$

Herein, m=0, 1, ..., $2N_{maxRB}-1$. $N_{maxRB}$ is the maximum number of RBs. ns is a slot number in a radio frame. l is an OFDM symbol index in a slot.

A pseudo-random sequence c(i) is defined by a gold sequence as follows.

$c(n)=(x_1(n+Nc)+x_2(n+Nc))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ [Equation 3]

Herein, Nc=1600, n=0, ..., N−1, N is a sequence length, and 'mod' is a modulo operation. A $1^{st}$ m-sequence is initialized as x1(0)=1, x1(n)=0, m=1, 2, ..., 30.

A $2^{nd}$ m-sequence is initialized as $c_{init}=2^{10}(7(ns+1)+l+1)$ $(2N^{cell}_{ID}+1)+2N^{cell}_{ID}N_{CP}$ at a start of each OFDM symbol. $N^{cell}_{ID}$ is a physical cell identity (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 3, 'P5' indicates an RE used to transmit the URS. The URS is also called a dedicated reference signal (DRS) or a demodulation reference signal (DM-RS).

The URS is transmitted only in an RB to which a corresponding PDSCH is mapped. Although P5 is indicated in FIG. 3 in addition to a region in which the PDSCH is transmitted, this is for indicating a location of an RE to which the URS is mapped.

The URS is used only by a wireless device which receives a corresponding PDSCH. A reference signal (RS) sequence ram) for the URS is equivalent to Equation 2. In this case, m=0, 1, ..., $12N_{PDSCH,RB}-1$, and $N_{PDSCH,RB}$ is the number of RBs used for transmission of a corresponding PDSCH. A pseudo-random sequence generator is initialized as $c_{init}=$ (floor(ns/2)+1)$(2N^{cell}_{ID}+1)2^{16}+n_{RNTI}$ at a start of each subframe. $n_{RNTI}$ is an identifier of the wireless device. floor(x) denotes a largest integer not greater than x.

The aforementioned initialization method is for a case where the URS is transmitted through the single antenna, and when the URS is transmitted through multiple antennas, the pseudo-random sequence generator is initialized as $c_{init}=$ (floor(ns/2)+1)$(2N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

Figure 4:
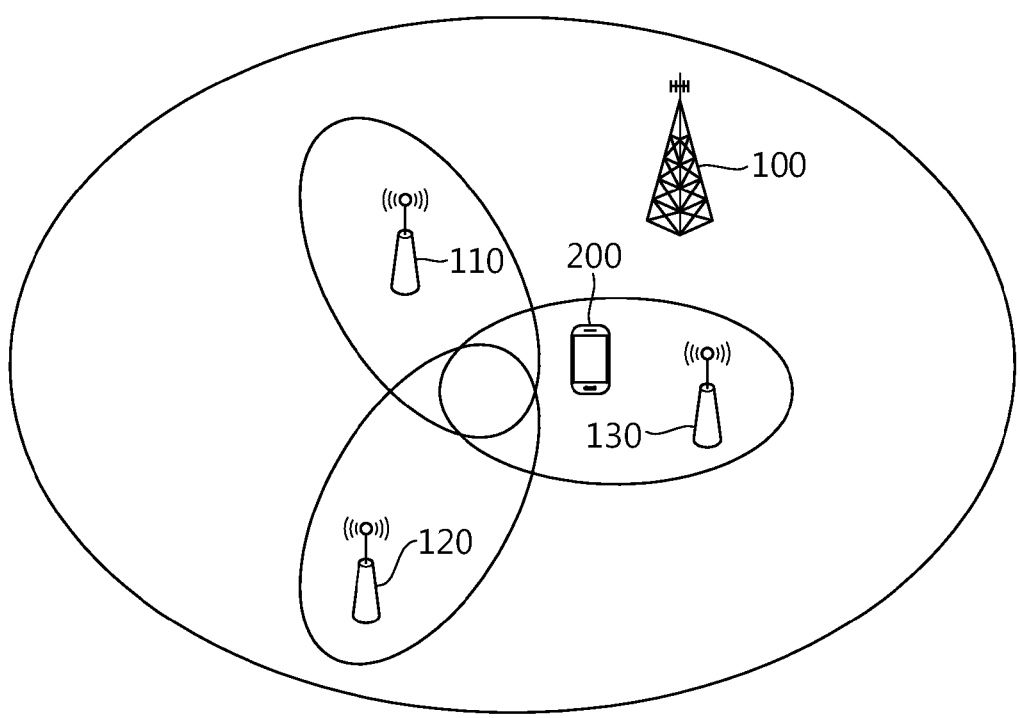
FIG. 4 shows a wireless communication system according to the present invention.

FIG. 4 shows a wireless communication system according to the present invention.

There is a macro BS 100 having a wide coverage, and one or more micro BSs 110, 120, and 130 having a coverage narrower than the coverage of the macro BS 100 are present in a specific area (this is called a hot spot area). The macro BS 100 may correspond to a macro cell. The micro BSs 110, 120, and 130 are also called low power BSs, and may correspond to a micro cell or a femto cell. The macro cell or the micro cell may be a serving cell if a connection with a wireless device 200 is established.

The wireless device 200 must detect many neighboring cells within a short time period, and must perform a measurement on signal quality for a corresponding cell. Therefore, a problem may occur when performing cell detection and synchronization by using only a PSS or SSS transmitted only through one OFDM symbol in one subframe similarly to the existing LTE system. This is because a great number of micro BSs 110, 120, and 130 are installed close to a specific area. A combination of the PSS/SSS can express only up to 504 cells, which may be insufficient to detect all micro cells.

Accordingly, in addition to the existing PSS/SSS, the wireless device 200 requires a signal for performing cell detection and synchronization within a short time period with respect to a micro cell. Hereinafter, this signal is called a discovery signal.

The discovery signal is a signal for detecting a target cell (e.g., a micro cell) in addition to the PSS/SSS. The discovery signal may be used to measure DL timing of the target cell and to acquire a PCI of the target cell.

The target cell may transmit the discovery signal together with the PSS/SSS, or may transmit only the discovery signal without the PSS/SSS.

When the discovery signal is transmitted in one or more OFDM symbols in predetermined subframe timing in each cell, if the discovery signal overlaps with the existing signals (e.g., PSS, SSS, CRS, etc.) transmitted through a corresponding subframe, there may be a problem in a legacy device (i.e., a device supporting only LTE) which does not know whether the discovery signal is transmitted in the corresponding subframe.

An embodiment described hereinafter proposes an operation for ensuring backward compatibility to avoid a problem of the operation of the legacy device even if the discovery signal is transmitted.

Figure 5:
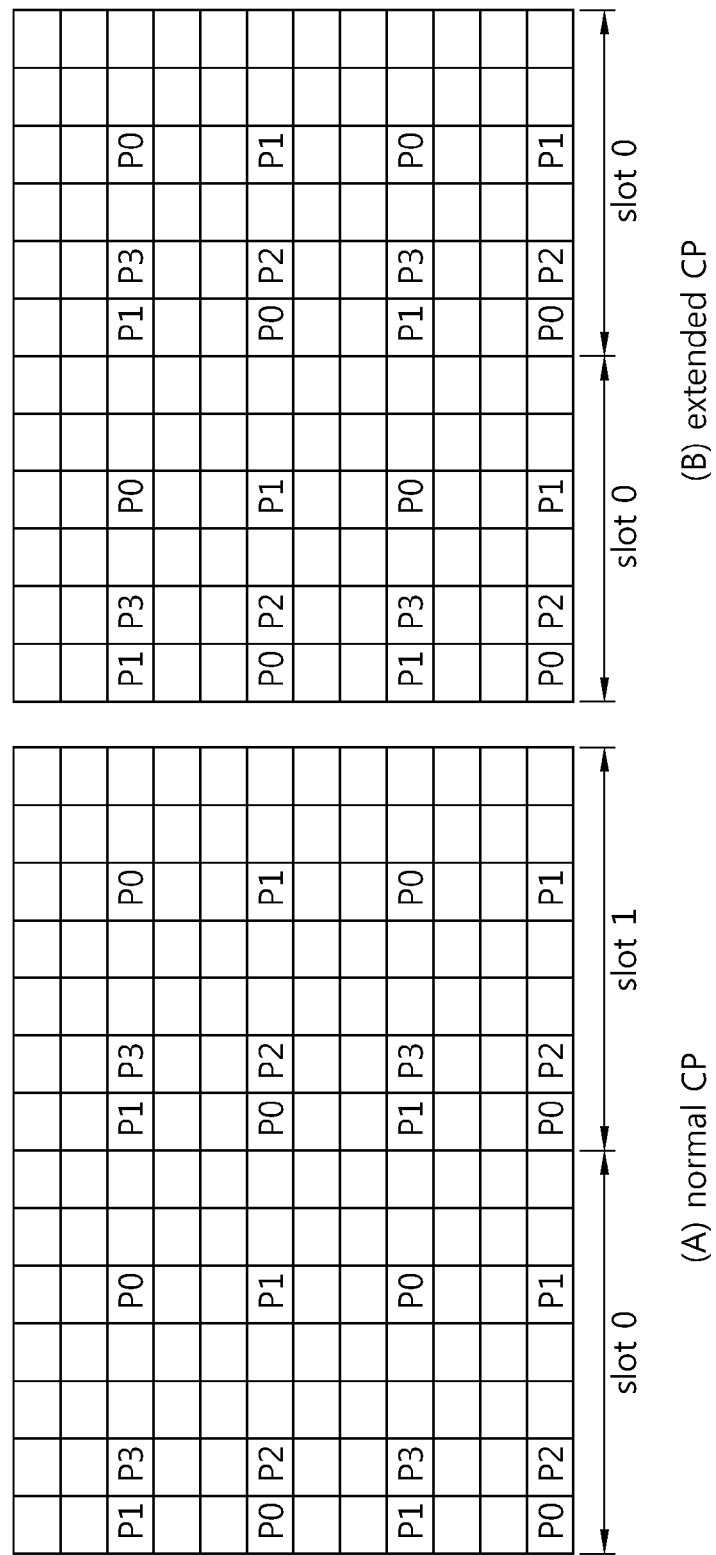
FIGS. 5(A) and 5(B) show a subframe structure in an LTE system.

FIG. 5 shows a subframe structure in an LTE system. A subfigure (A) shows a subframe having a normal CP, and a subfigure (B) shows a subframe having an extended CP. In the normal CP, the subframe includes 14 OFDM symbols. In the extended CP, the subframe includes 12 OFDM symbols.

In FIG. 5, 'P0' indicates a CRS for a $1^{st}$ antenna port (hereinafter, CRS0), 'P1' indicates a CRS for a $2^{nd}$ antenna port (hereinafter, CRS1), 'P2' indicates a CRS for a $3^{rd}$ antenna port (hereinafter, CRS2), and 'P3' indicates a CRS for a $4^{th}$ antenna port (hereinafter, CRS3).

In the normal CP, the CRS0 and the CRS1 are transmitted in $1^{st}$ and $5^{th}$ OFDM symbols in each slot, and the CRS2 and the CRS3 are transmitted in a $2^{nd}$ OFDM symbol in each slot. In the extended CP, the CRS0 and the CRS1 are transmitted in $1^{st}$ and $3^{rd}$ OFDM symbols of each slot, and the CRS2 and the CRS3 are transmitted in a $2^{nd}$ OFDM symbol in each slot.

In general, a legacy device uses the CRS0 and CSR1 transmitted in the $1^{st}$ OFDM symbol of each subframe to measure a neighboring cell. Therefore, if the discovery signal is transmitted across the entirety of one subframe, there may be a problem in the measurement of the subframe.

Figure 6:
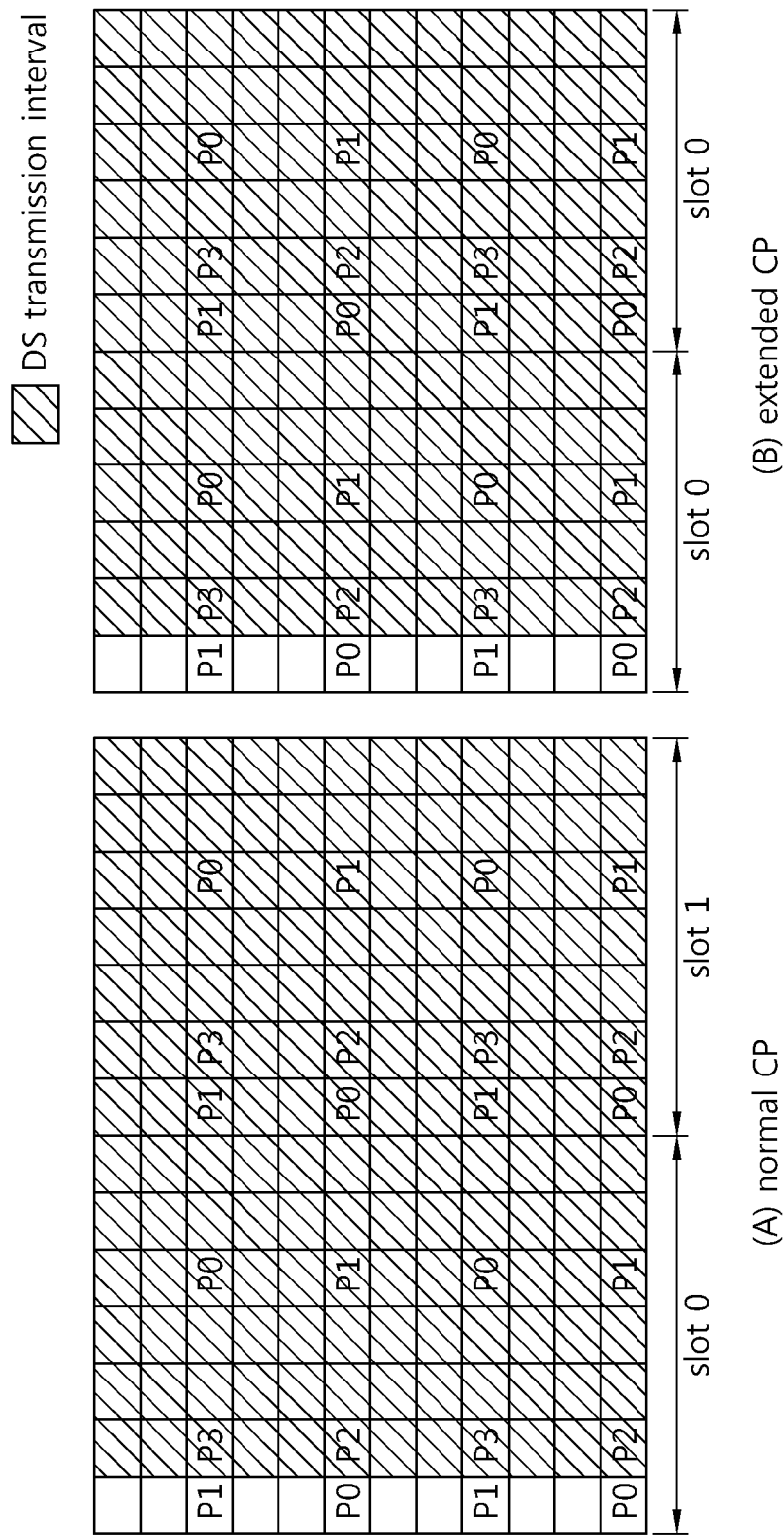
FIGS. 6(A) and 6(B) show a subframe structure for transmitting a discovery signal according to an embodiment of the present invention.

FIG. 6 shows a subframe structure for transmitting a discovery signal according to an embodiment of the present invention.

The discovery signal is transmitted in at least one of the remaining OFDM symbols other than a $1^{st}$ OFDM symbol of a subframe. An OFDM symbol in which the discovery signal is transmitted may be called a discovery signal (DS) OFDM symbol, and a set of DS OFDM symbols in the subframe may be called a DS transmission interval. For example, the DS transmission interval may include from a $2^{nd}$ OFDM symbol to a last OFDM symbol of the subframe.

Alternatively, if a switching gap between DL/UL transmission subframes is required in a TDD system, the DS transmission interval may include an OFDM symbol excluding a range from the $2^{nd}$ OFDM symbol to one last OFDM symbol of the subframe. Alternatively, the DS transmission interval may include an OFDM symbol excluding a range from the $2^{nd}$ OFDM symbol to a plurality of last OFDM symbols of the subframe.

A CRS may not be transmitted in the DS transmission interval. All or some of REs in an OFDM symbol belonging to the DS transmission interval may be used for transmission of a discovery signal.

In case of a subframe in which a PSS/SSS is transmitted, an OFDM symbol in which the PSS/SSS is transmitted in the DS transmission interval may be excluded.

The DS transmission interval may be configured except for an OFDM symbol which is configured or can be configured to transmit a channel state information-reference signal (CSI-RS). The discovery signal may not be transmitted in an OFDM symbol in which the CRI-RS is transmitted. In the normal CP, the CSI-RS is transmitted in $6^{th}$ and $7^{th}$ OFDM symbols. In the extended CP, the CSI-RS is transmitted in $5^{th}$ and $6^{th}$ OFDM symbols.

The discovery signal may not be transmitted in the subframe which is configured or can be configured to transmit the CSI-RS. This may be useful when the CSI-RS is used in cell measurement.

In an LTE TDD system, the discovery signal may not be transmitted in a special subframe. The special subframe includes a downlink pilot time slot (DwPTS), a guard period (GP), and an uplink pilot time slot (UpPTS). The DwPTS is used in a UE for initial cell search, synchronization, or channel estimation. The UpPTS is used in a BS for a channel estimation and uplink transmission time alignment of the UE. The GP is a period for removing an interference which occurs in an uplink due to a multi-path delay of a downlink signal between the uplink and a downlink. This is because the number of OFDM symbols that can be used in downlink transmission may be insufficient in a special subframe. More specifically, when the UL-DL configuration is 0 or 5, the discovery signal may not be transmitted in the special subframe.

The discovery signal is not transmitted in a subframe which is configured to transmit a positioning reference signal (PRS). This is because the PRS occupies many OFDM symbols, and thus energy for the discovery signal may be insufficient.

The discovery signal may not be transmitted in an OFDM symbol in which an interference measurement resource (IMR) is configured or can be configured. Alternatively, the discovery signal may not be transmitted in a subframe in which the IMR is configured or can be configured. This may be useful when the IMR is used in cell measurement.

Figure 7:
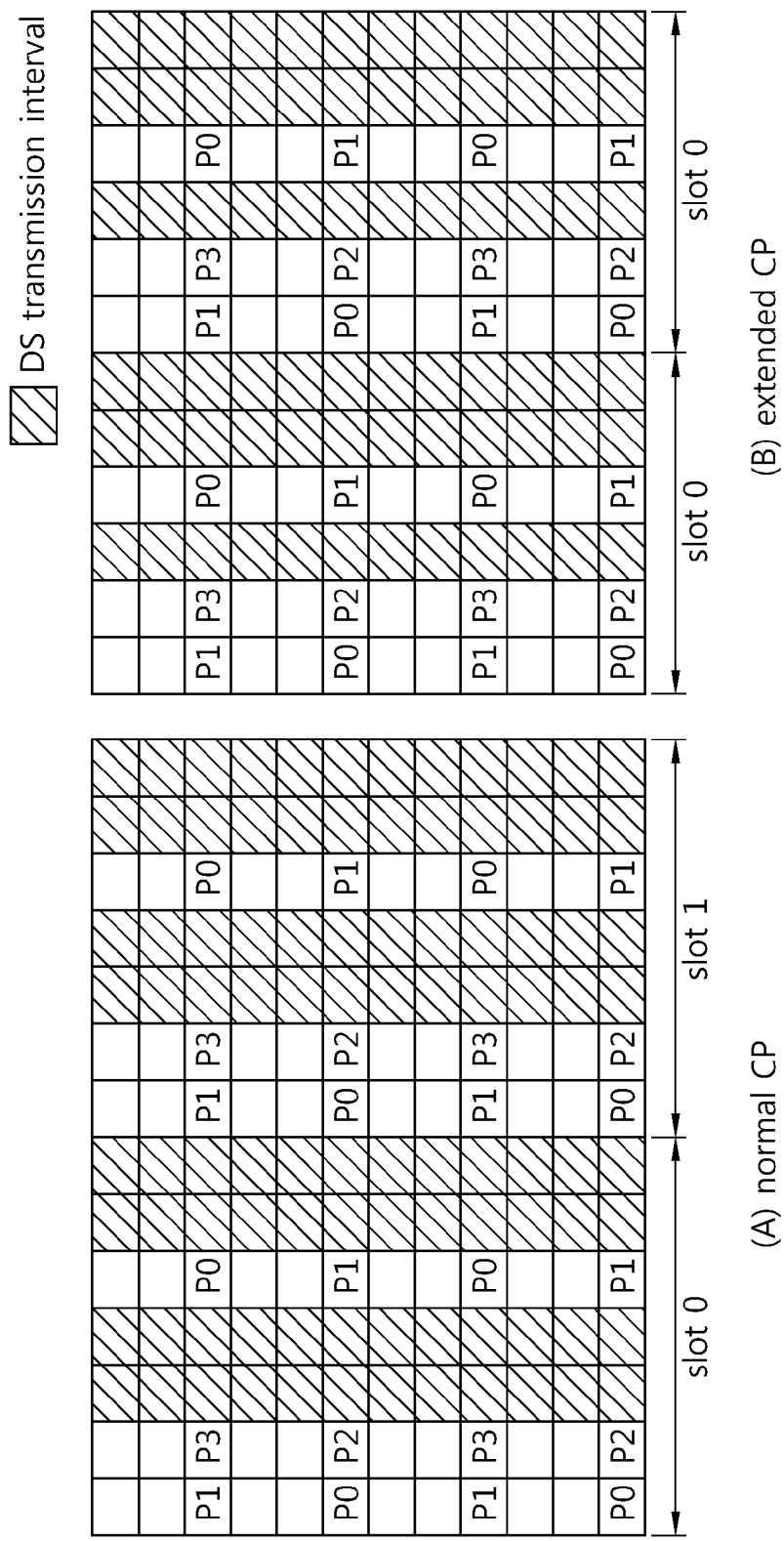
FIGS. 7(A) and 7(B) show a subframe structure for transmitting a discovery signal according to another embodiment of the present invention.

FIG. 7 shows a subframe structure for transmitting a discovery signal according to another embodiment of the present invention.

The discovery signal may be transmitted in the remaining OFDM symbols other than an OFDM symbol in which a CRS is transmitted in a subframe. A DS transmission interval may include the remaining OFDM symbols other than an OFDM symbol in which a CRS0, a CRS1, a CRS2, and a CRS4 are transmitted.

Figure 8:
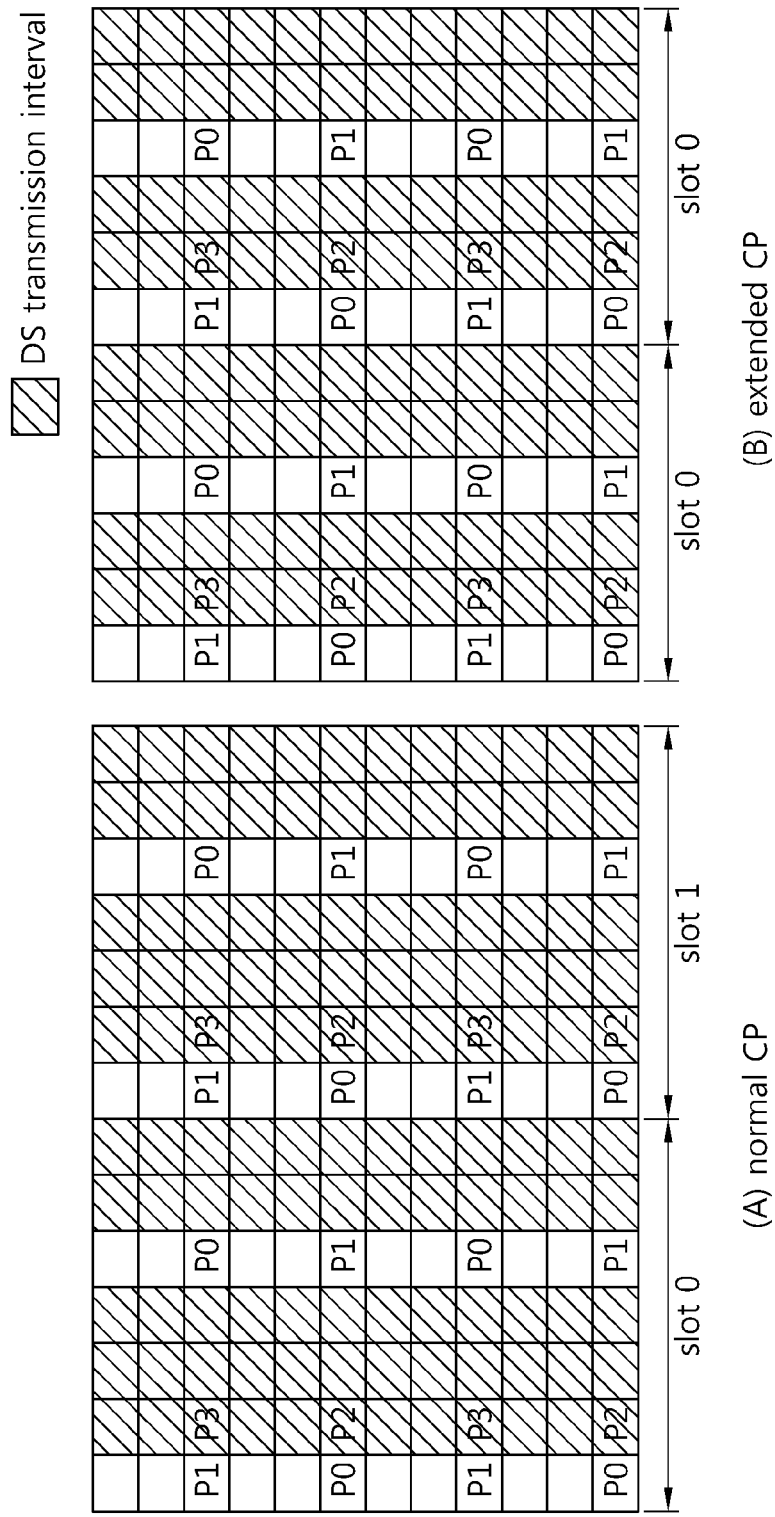
FIGS. 8(A) and 8(B) show a subframe structure for transmitting a discovery signal according to another embodiment of the present invention.

FIG. 8 shows a subframe structure for transmitting a discovery signal according to another embodiment of the present invention.

In comparison with the embodiment of FIG. 7, a DS transmission interval may include the remaining OFDM symbols other than an OFDM symbol in which a CRS0 and a CRS1 are transmitted. This may be useful in a device not supporting a CRS2 and a CRS3.

Alternatively, if a switching gap between DL/UL transmission subframes is required in a TDD system, the DS transmission interval may include an OFDM symbol excluding a range from the $2^{nd}$ OFDM symbol to one last OFDM symbol of the subframe. Alternatively, the DS transmission interval may include an OFDM symbol excluding a range from the $2^{nd}$ OFDM symbol to a plurality of last OFDM symbols of the subframe.

In the DS transmission interval, the maximum number of OFDM symbols included in the PDCCH region may be excluded. For example, the DS transmission interval may start from a $3^{rd}$ OFDM symbol. Alternatively, in a system having a system bandwidth exceeding 10 RBs, the DS transmission interval may start from a $3^{rd}$ OFDM symbol. In a system having a system bandwidth equal to or less than 10 RBs, the DS transmission interval may start from a $4^{th}$ OFDM symbol.

Figure 9:
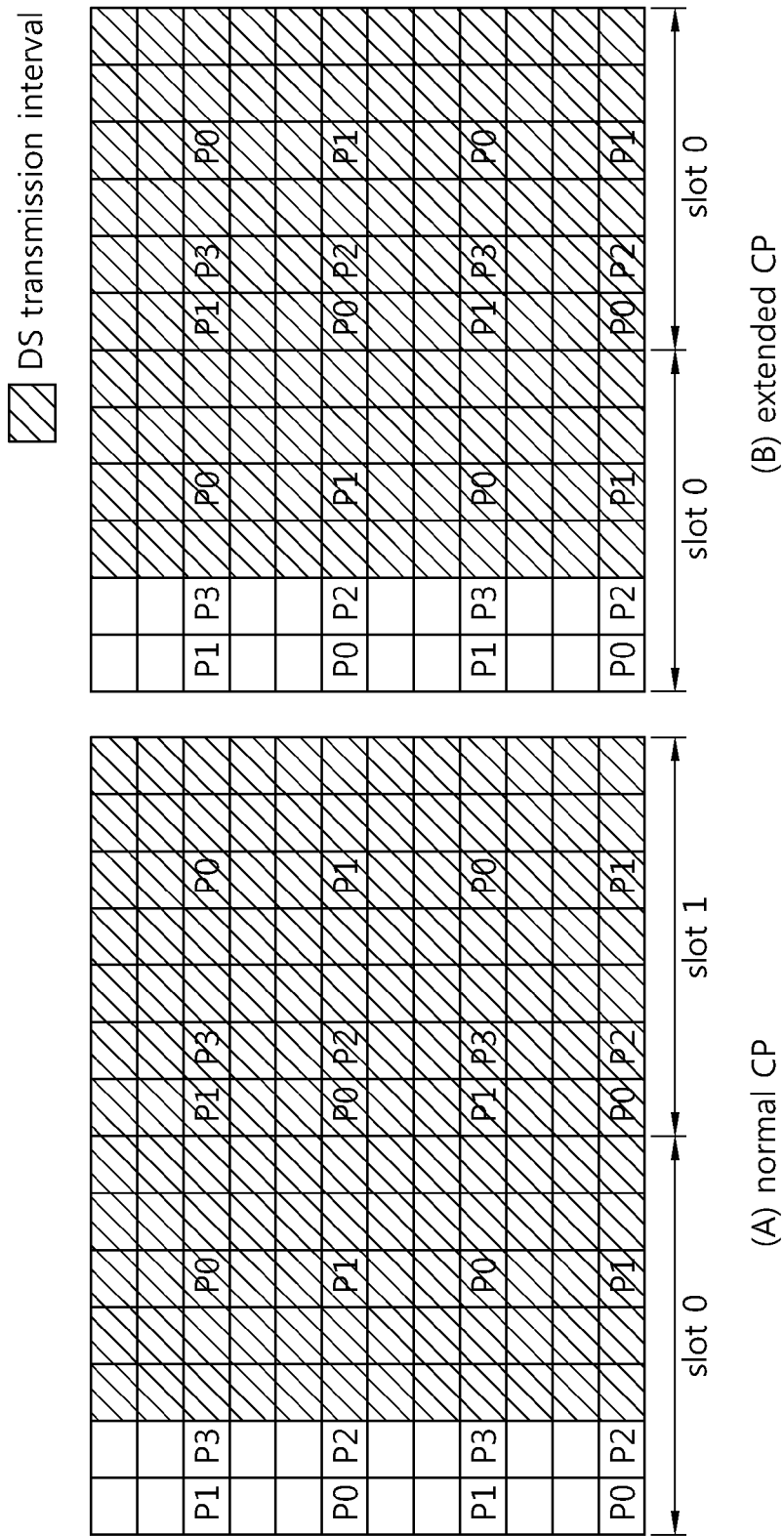
FIGS. 9(A) and 9(B) show a subframe structure for transmitting a discovery signal according to another embodiment of the present invention.

FIG. 9 shows a subframe structure for transmitting a discovery signal according to another embodiment of the present invention.

The discovery signal may be transmitted only in a designated subframe. The subframe configured to transmit the discovery signal is called a discovery subframe. Some of a plurality of subframes may be designated as the discovery subframe. The subframe may be defined in unit of one or more radio frames. For example, if it is defined in unit of one radio frame having 10 subframes, the discovery subframe may be designated with a 10-bit bitmap. The discovery subframe may be designated except for a subframe in which a PBCH and a PSS/SSS are transmitted among the radio frames. The discovery subframe may include a multicast broadcast single frequency network (MBSFN) subframe. Alternatively, only the MBSFN subframe may be designated as the discovery subframe. Some or all of subframes designated as the MBSFN subframe may be designated as the discovery subframe.

In the MBSFN subframe, the discovery signal may be transmitted in the remaining OFDM symbols other than first two OFDM symbols. This is because the legacy device attempts to detect a CRS and a PDCCH only in the first two OFDM symbols of the MBSFN subframe. All or some of REs of an OFDM symbol belonging to the DS transmission interval may be used in transmission of the discovery signal.

According to the aforementioned embodiment, a wireless device capable of detecting a discovery signal may determine a CFI and/or a DS transmission interval in a discovery subframe as follows.

For one example, the wireless device may assume a CFI value in the discovery subframe as a predetermined value (e.g., 2). The wireless device may receive a PDCCH/PHICH on the basis of the assumed CFI value. The DS transmission interval may include the remaining OFDM symbols other than an OFDM symbol indicated by the CFI.

For another example, a BS may report the CFI value in the discovery subframe to the wireless device through RRC signaling. The DS transmission interval may include the remaining OFDM symbols other than the OFDM symbol indicated by the CFI.

For another example, the wireless device may assume that a start of the DS transmission interval in the discovery subframe is a fixed OFDM symbol (e.g., a $3^{rd}$ OFDM symbol). If a CFI value on a PCFICH includes the DS transmission interval, the wireless device may determine that there is a problem in receiving of the PCFICH. In addition, receiving of a signal of a PDSCH or the like may be excluded in the DS transmission interval determined on the basis of a corresponding fixed value.

For another example, the BS may report a start point of the DS transmission interval of the discovery subframe to the wireless device. If a CFI value of a PCFICH includes the DS transmission interval, the wireless device may determine that there is a problem in receiving of the PCFICH. In addition, receiving of a signal of a PDSCH or the like may be excluded in the DS transmission interval determined on the basis of the indicated value.

Meanwhile, if a frequency/time domain in which a discovery signal of a serving cell is transmitted overlaps with another signal, the wireless device may perform the following operation.

In a first example, if a region in which the discovery signal is transmitted overlaps with a search space for an E-PDCCH, E-PDCCH detection in the entirety of the search space may be discarded. Alternatively, in a region overlapping with the region in which the discovery signal in the search space, E-PDCCH detection may be discarded.

In a second example, if the region in which the discovery signal is transmitted overlaps with a region for transmitting a semi persistent scheduling (SPS) PDSCH, the wireless device may not attempt receiving of the SPS PDSCH. Alternatively, receiving of the SPS PDSCH may be attempted in a region other than the overlapping region.

In a third example, if the region in which the discovery signal is transmitted overlaps with CSI-RS transmission, the wireless device may discard channel estimation using corresponding CSI-RS in the overlapping region. Alternatively, channel estimation using the CSI-RS may be discarded in the entirety of the subframe in which the discovery signal is transmitted.

In a fourth example, if the region in which the discovery signal is transmitted overlaps with an IMR, interference measurement using the IMR may be excluded in a corresponding subframe.

Figure 10:
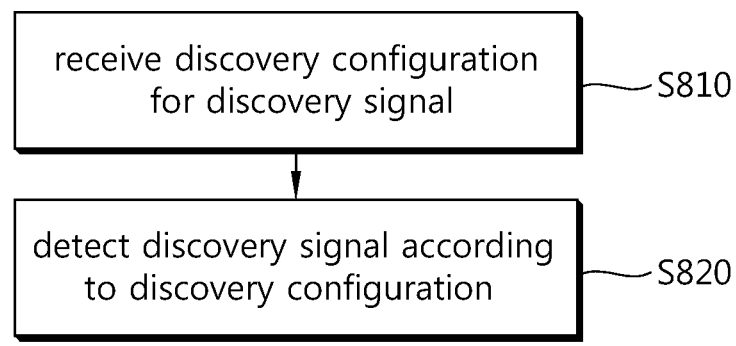
FIG. 10 shows a method of detecting a discovery signal according to an embodiment of the present invention.

FIG. 10 shows a method of detecting a discovery signal according to an embodiment of the present invention. This method may be performed by a wireless device.

In step S810, the wireless device receives a discovery configuration from a network. The network may include a macro BS or a macro cell. Since the wireless device is connected to the macro cell, the macro cell may be called a serving cell of the wireless device.

The discovery signal may be transmitted in a subframe based on at least any one of the embodiments of FIG. 6 to FIG. 9. The discovery configuration may include information regarding a discovery signal sequence, discovery subframe, and/or DS transmission interval in which the discovery signal is transmitted.

The discovery configuration may include information regarding a period and/or start offset of the discovery subframe. The discovery configuration may include a bitmap which designates the discovery subframe.

The discovery configuration may include information regarding a sequence for the discovery signal. The sequence information may include information regarding generating of the sequence for the discovery signal or information for acquiring a PCI from the discovery signal. The discovery signal may be generated based on the Zadoff-Chu sequence of Equation 1 or the sequence of Equation 2. The sequence generation information may include information regarding a root index or a cyclic shift for the Zadoff-Chu sequence. The sequence generation information may include information regarding an initial value for the sequence of Equation 2.

The discovery configuration may include information regarding a time-frequency domain for detecting the discovery signal in the discovery subframe. The discovery configuration may include information regarding a DS transmission interval. Information regarding the DS transmission interval may include information regarding a start point of the DS transmission interval or the number of OFDM symbols included in the DS transmission interval. The discovery configuration may include information regarding a frequency domain (e.g., a subcarrier index) in which the discovery signal is transmitted.

In step S820, the wireless device detects a discovery signal of a target cell according to the discovery configuration. The wireless device may acquire a PCI of a corresponding cell on the basis of the discovery signal.

Figure 11:
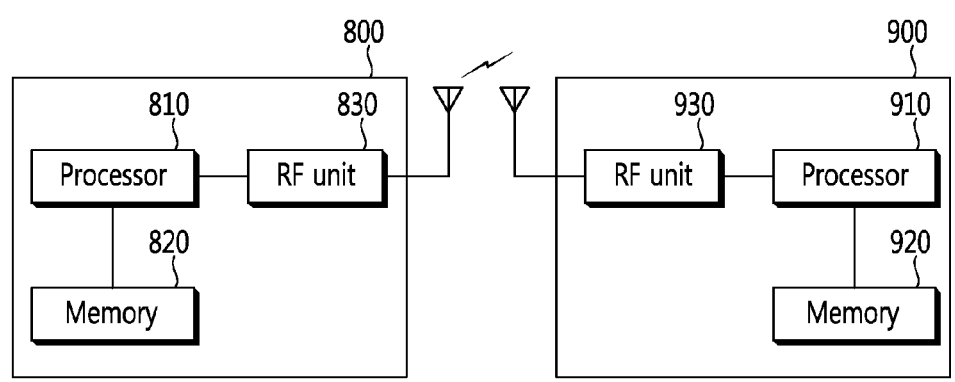
FIG. 11 is a block diagram of a wireless communication system according to an embodiment of the present invention.

FIG. 11 is a block diagram of a wireless communication system according to an embodiment of the present invention.

A BS 800 includes a processor 810, a memory 820, and a radio frequency (RF) unit 830.

The processor 810 implements the aforementioned operation of the BS. In case of a macro cell, the processor 810 may instruct the RF unit 830 to transmit a discovery configuration for a discovery signal. In case of a micro cell, the processor 810 may instruct the RF unit 830 to transmit the discovery signal based on the discovery configuration. The RF unit 830 transmits and receives a radio signal.

The memory 820 stores instructs for an operation of the processor 810. The stored instructions may be executed by the processor 810 to implement the aforementioned operation of the BS.

A wireless device 900 may include a processor 910, a memory 920, and an RF unit 930.

The processor 910 implements the aforementioned operation of the wireless device. The processor 910 may receive a discovery configuration, and may detect a discovery signal. The RF unit 930 transmits and receives a radio signal.

The memory 920 stores instructs for an operation of the processor 910. The stored instructions may be executed by the processor 910 to implement the aforementioned operation of the wireless device.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for detecting a discovery signal in a wireless communication system, the method comprising:

receiving, by a wireless device, a discovery configuration for detecting the discovery signal of a target cell from a serving cell;

detecting, by the wireless device, the discovery signal transmitted by the target cell according to the discovery configuration; and obtaining a cell identity (ID) of the target cell based on the discovery signal, wherein the discovery configuration comprises information regarding a discovery subframe in which the discovery signal is transmitted among a plurality of subframes, and wherein the discovery subframe comprises orthogonal frequency division multiplexing (OFDM) symbols, and the discovery signal is detected in one or more OFDM symbols among the plurality of OFDM symbols.

2. The method of claim 1, wherein in the OFDM symbol in which the discovery signal is detected, a first OFDM symbol among the plurality of OFDM symbols is excluded.

3. The method of claim 1, wherein in the OFDM symbol in which the discovery signal is detected, a second OFDM symbol among the plurality of OFDM symbols is excluded.

4. The method of claim 1, wherein the discovery subframe comprises a multicast broadcast single frequency network (MBSFN) subframe.

5. The method of claim 1, wherein a synchronization signal for the serving cell is not transmitted in the discovery subframe.

6. The method of claim 1, wherein the discovery configuration comprises information regarding the OFDM symbol in which the discovery signal is detected.

7. An apparatus for detecting a discovery signal in a wireless communication system, the apparatus comprising:

a radio frequency (RF) unit that transmits and receives a radio signal; and a processor that controls the RF unit to:

receive a discovery configuration for detecting the discovery signal of a target cell from a serving cell;

detect the discovery signal transmitted by the target cell according to the discovery configuration; and obtaining a cell identity (ID) of the target cell based on the discovery signal, wherein the discovery configuration comprises information regarding a discovery subframe in which the discovery signal is transmitted among a plurality of subframes, and wherein the discovery subframe comprises orthogonal frequency division multiplexing (OFDM) symbols, and the discovery signal is detected in one or more OFDM symbols among the plurality of OFDM symbols.

* * * * *